July 17, 1934.  P. P. PIPES  1,967,131
RAIL BOND
Original Filed April 2, 1929
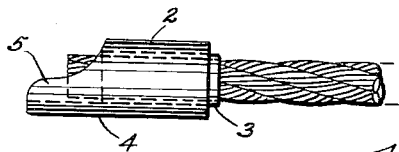
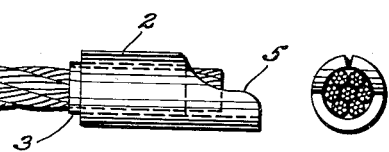
FIG. 1.   FIG. 2.
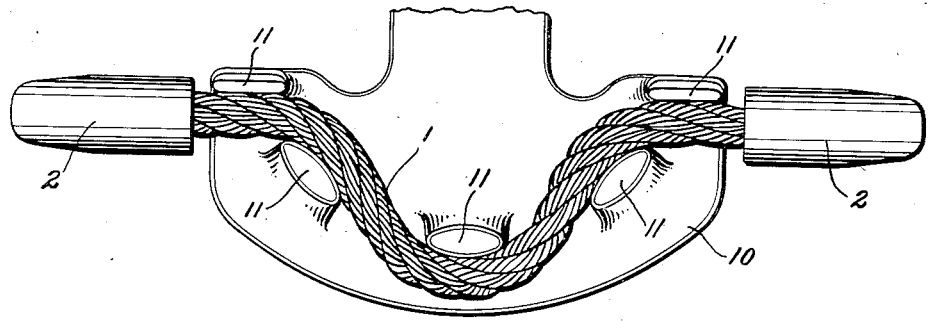
FIG. 3.
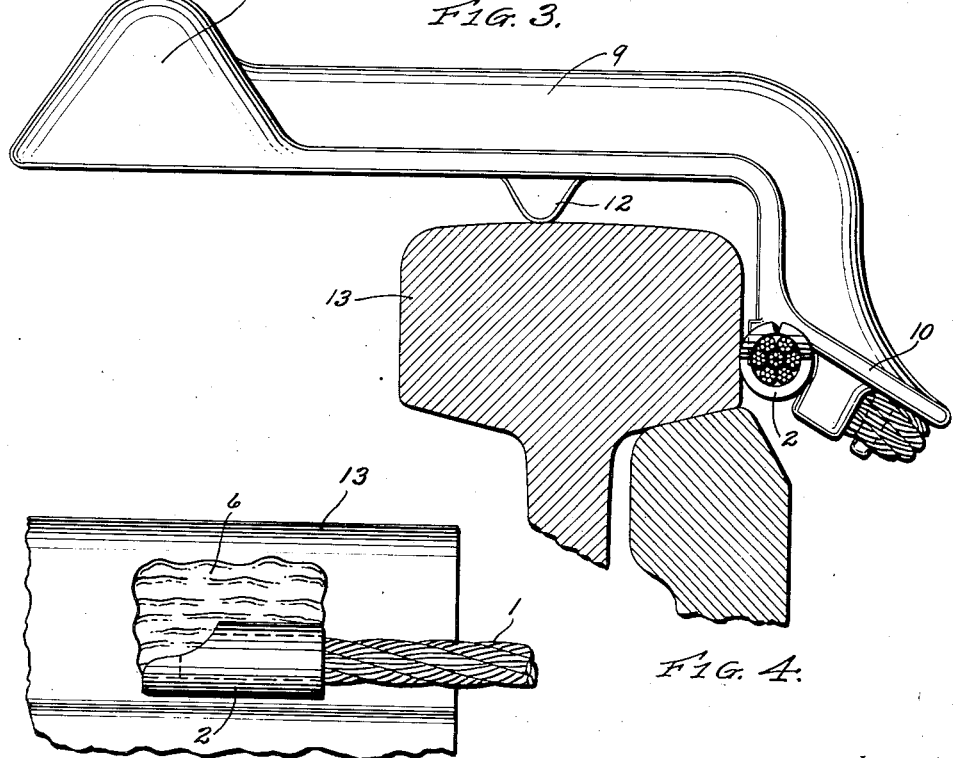
FIG. 4.
FIG. 5.
Witness
H. J. Stromberger
Inventor
PLINY P. PIPES
By
Attorney Patented July 17, 1934

1,967,131

UNITED STATES PATENT OFFICE 1,967,131

RAIL BOND

Pliny P. Pipes, Mansfield, Ohio, assignor to The Ohio Brass Company, Mansfield, Ohio, a corporation of New Jersey Original application April 2, 1929, Serial No. 351,883. Divided and this application January 18, 1930, Serial No. 421,746

3 Claims. (Cl. 173—278)

My invention relates to the method and means for bonding rails, that is, efficiently connecting two or more rails which are required to carry current.

One of the objects of my invention is to provide a method of positioning the bond to the rail surface to which it is to be welded and another object is to give to the bond a desired formation at the time of application and to provide a tool for maintaining the bond in said formed condition.

In the drawing accompanying this specification:—

Fig. 1 is a view in elevation of one form of my invention prior to its application to the rail.

Fig. 2 is an end view of Fig. 1.

Fig. 3 is a view of my bond secured to a forming and holding device prior to its application to a rail.

Fig. 4 is a side view of Fig. 3 with the bond and holding device in position upon the side surface of a rail prior to the welding operation securing the bond to the rail.

Fig. 5 is a side view of the rail and one terminal to show the manner in which the terminal is attached to the rail.

It is found that bonds having the flexible portion of copper have a relatively short life under steam road service due apparently to the severe conditions at the joints as trains of many cars pass over such joints. Bonds, however, formed of a body composed of a plurality of wires of high tensile strength such as those of iron, carbon steel or alloyed steel will have a far greater life than a bond having a copper body and apparently the higher the tensile strength the greater the life, but as the tensile strength increases or the carbon content of the steel increases the body will yieldably resist formation to a greater degree and the body may possess such a high resistance to forming that it is quite difficult to form the body and have it maintain such form prior to its attachment to the rail.

I have therefore devised a tool by means of which the flexible portion of the bond may be given the proper formation before the bond is applied to the rail and to maintain such formation while the bond is being applied. After such a bond has been welded to the rail the formation will be maintained without the assistance of the tool.

It might be said in explanation that the heat treatment to which the body wires are subjected will affect materially the life and spring properties of the bonded body.

In making up a bond of my improved construction, I prefer a body 1 with a ferrous or non-ferrous terminal 2 on one or both ends and fixedly secured thereto with or without an interposed sleeve 3. I prefer the terminal of ferrous metal and the sleeve may be of ferrous or non-ferrous metal. The terminal 2 may be stamped from a sheet to the desired shape and then formed to fit the body, after which it is secured to the body with a greater or less degree of pressure and with or without the sleeve 3. If sufficient compression is used the wires of the body will be found to make impressions in the sleeve or surface of the terminal providing the sttock from which the terminal is made is softer than the body and when the sleeve 3 is of copper or other non-ferrous materials, the copper tends to flow into the voids between the outer wires of the body.

The terminal is composed of the tubular portion 4 and the projecting portion 5 supports the fused attaching metal 6 in fused relation to the end face of the body, the terminal, the sleeve and rail. The body projects beyond the end of the part 4 and forms with the end of the terminal an end face disposed substantially oblique to the longitudinal axis of the terminal. The terminal may be made of other shapes to meet requirements, or from seamless tubing.

I may make the body of a ferrous or a non-ferrous metal or of ferrous metal with a copper core.

The forming and holding tool comprises a body member 9 which overhangs the rail and a portion 10 provided with projections 11 spaced apart and so alined that the body 1 can be positioned between the projections 11 and thereby held in a formed shape until finally welded to the rail and the body will thereafter maintain its formed position having a loop shaped portion at the center. This loop portion is essential in that it adds to the flexibility of the bonded body and permits longitudinal movement of the rail.

It should be noted that if the bonded body tends to maintain or assume a straight line position as shown in Fig. 1 due to its resiliency, that the members 11 will resist return movement of the cable to a straight form. The forming tool has a portion 12 which projects from the member 9 and rests upon the upper surface of the rail 13 and is also provided with a weighted portion 14, which, to a considerable extent balances the tool against the combined weight of the portion 10 and the bond. Therefore, it is merely necessary after positioning the bond between the lugs 11 to place the tool upon the rail with the terminals 2 against the side surface of the rail and the over-balanced weight of the bond and portion 10 will cause the terminals to maintain their contact with the rail until welded into position.

In welding, a heating flame of the electric arc or oxy-acetylene burner may be used, with which those skilled in the art are familiar and either a ferrous welding metal or a non-ferrous metal such as copper or bronze, may be used. Phosphor-copper and silicon-copper, give very good results. When the arc method is used with a metallic electrode in place of a carbon electrode, the parts are fused by the electric arc and the molten electrode is deposited on the terminal member and end of the body member and against the rail surface, thus uniting each to the other by the metal from the electrode.

The body member 1 is preferably made of a plurality of strands which are each composed of a plurality of wires which in turn are preferably preformed before being placed in the strands and the strands are preformed before being made into the body or cable. This permits cutting the cable to proper length without the ends flying apart and is a very valuable feature in aiding in the manufacture of the bond. Also the usual stresses due to ordinary stranding are neutralized by preforming.

When the body is of a ferrous metal the sleeve 3 may best be made of a ferrous metal thereby preventing electrolytic action between the sleeve and body which is likely to take place when the sleeve is of copper and at the expense of the ferrous body next to the inner end of the terminal. If the body and terminal are of ferrous metal and no sleeve 3 used, there is only ordinary corrosion of the parts.

This application is a division of my co-pending case Serial No. 351,883 filed April 2nd, 1929, which has matured into Patent Number 1,865,723.

There are modifications which will suggest themselves to those skilled in the art and which will fall within the scope of my invention, therefore I wish to be limited only by my claims.

I claim:—

1. The method of applying bonds to rails by welding, the bonds having a terminal of metal at each end of the body, comprising the steps of applying a protecting and forming tool to the body which will protect the body from the welding flame and hold the body in a preformed condition with the terminals substantially aligned and exposed and projecting away from the said tool, then positioning the bond and tool on the rail with the body protected by the tool and with the terminals arranged for welding to the rails, then applying a heating flame to the terminals and adjacent rail surfaces and applying welding metal in a fused state to the terminals and rail surface to unite them and then removing the said tool.

2. The method of bonding rails by welding thereto a bond having a flexible body and a terminal at each end, comprising the steps of applying to the body a protecting and body holding tool having means projecting from one face thereof to engage the bond body to give and maintain a predetermined amount of loop to the body while applying the bond to the rail and to protect the body from the welding flame and permit the terminals to project from the tool with their axes in alignment, then positioning the bond and tool on the rail, then applying a heating flame to the terminals and adjacent rail surface and simultaneously applying welding metal to unite the terminals and rail and then removing the tool.

3. The method of bonding rails with bonds having as initially made a resilient body strongly resisting permanent forming extending between terminals and with the axis of the bond body substantially straight and in alignment with the terminals, comprising the steps of detachably securing to the body prior to positioning the bond on the rail a bonding tool having a flame protecting member with forming means thereon arranged to engage the body at spaced points along its length between the body ends and permit the ends to project beyond the protecting member and give the body a predetermined curvature and maintain such curvature and protect the body from the welding flame during the welding of the bond to the rail, then positioning the bond and tool in place on the rail and then applying a heating flame to the bond terminals and the end face of the body to secure the body to the rail ends and then removing the bonding tool, the said predetermined curvature of the body being maintained after the bonding tool is removed.

PLINY P. PIPES.